(12) United States Patent
Emmett

(10) Patent No.: US 6,200,513 B1
(45) Date of Patent: Mar. 13, 2001

(54) METHOD OF PRODUCING A PLASTIC PULLEY WITH A METAL INSERT

(75) Inventor: Kevin J. Emmett, Dothan, AL (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/265,099

(22) Filed: Mar. 9, 1999

Related U.S. Application Data

(60) Provisional application No. 60/077,415, filed on Mar. 9, 1998, now abandoned.

(51) Int. Cl.$^7$ ............................ B29C 33/12; B29C 43/18; B29C 45/14
(52) U.S. Cl. ........................... 264/274; 264/275; 264/320
(58) Field of Search ................................ 264/259, 271.1, 264/273, 274, 275, 277, 278, 319, 320

(56) References Cited

U.S. PATENT DOCUMENTS

| | | | |
|---|---|---|---|
| 3,978,181 | * 8/1976 | Vahle | 264/275 |
| 4,366,609 | 1/1983 | Speer . | |
| 4,468,210 | 8/1984 | McCuthan . | |
| 4,473,363 | 9/1984 | McCuthan . | |
| 4,652,415 | * 3/1987 | Nguyen et al. | 264/255 |
| 4,824,627 | * 4/1989 | Hammer et al. | 264/275 |
| 4,913,688 | 4/1990 | Bekheet . | |
| 5,266,246 | * 11/1993 | Johnson et al. | 264/40.1 |
| 5,361,883 | 11/1994 | Yamamoto . | |
| 5,476,423 | 12/1995 | Meyer . | |
| 5,728,343 | * 3/1998 | Ueno | 264/242 |
| 5,846,470 | * 12/1998 | Funatsu et al. | 264/328.7 |

* cited by examiner

Primary Examiner—Angela Ortiz
(74) Attorney, Agent, or Firm—C. H. Castleman, Esq.; S. G. Austin, Esq.; J. A. Thurman, Esq.

(57) ABSTRACT

A method for producing a pulley assembly intended primarily for use with the endless drive belt of a vehicle accessories drive system is provided. The method involves placing a circular metal insert having an axis and an outer substantially flat circumferential surface extending radially from the axis on a locating means, located inside a mold cavity and positioned around the outside circumference of the metal insert, for positioning the metal insert inside the mold cavity before molding and for maintaining the roundness of the metal insert during molding, and molding a plastic annular body about the metal insert. A pulley assembly produced by this method is also provided. The method of producing the pulley assembly may include modifying the outer flat circumferential surface of the metal insert prior to molding the plastic annular body about the metal insert, for clamping, structurally bonding, and resisting relative rotation between the plastic body and the metal insert.

18 Claims, 7 Drawing Sheets

METHOD OF PRODUCING A PLASTIC PULLEY WITH A METAL INSERT

This application claims the benefit of U.S. Provisional Application No. 60/077,415, filed Mar. 9, 1998, now abandoned.

BACKGROUND OF THE INVENTION

The present invention relates generally to the field of pulleys such as may be used with the endless drive belt of a vehicle accessories drive system, and a method for producing the pulley. More particularly, the invention relates to i method of producing a pulley assembly, in which a plastic outer pulley body is molded about a metal insert by utilizing a locating means for positioning the metal insert inside the mold cavity, to maintain the roundness of the metal insert inside the plastic outer pulley body during molding and to ensure the concentricity of the belt engaging portion of the plastic outer pulley body relative to the round metal insert. Specifically, the invention relates to a method of producing a pulley assembly, in which a plastic outer pulley body is molded about a metal insert by utilizing a locating means for positioning the metal insert inside the mold cavity, and including a locking means on the outer flat circumferential surface of the metal insert to resist relative rotation between the plastic outer pulley body and the metal insert.

Pulleys are commonly used in vehicle accessory drive systems. Various vehicle accessories such as the power steering pump, alternator, air conditioning pump and water pump are operated by a single endless drive belt driven by a pulley connected to the engine crankshaft and linked to driven pulleys operatively associated with the accessories. This system is referred to as a "serpentine" drive belt system. Driving a number of accessories, particularly with a serpentine drive belt, requires careful handling of the belt to ensure proper placement of the belt on the driven pulleys operatively associated with the accessories. Precise location of the belt frequently calls for the use of idler pulleys. In addition, to prevent slippage of the belt, a constant load must be maintained on the endless drive belt system. The use of a tensioner assembly, complete with a tensioner arm attached to a tensioner pulley, helps maintain a load or torque on the endless drive belt system. Idler and tensioner pulleys are typically manufactured from steel, but the steel is expensive, heavy and can be difficult to form into a satisfactory pulley construction. These pulleys are also manufactured from nylon, but the nylon does not have good dimensional stability and the nylon pulley experiences excessive wear during operation.

Pulleys formed of plastic and metal are not new, per se; prior art plastic belt-driven pulleys with metal inserts exist of the type in which a plastic outer pulley body is both molded on and supported on a metal disc. U.S. Pat. Nos. 4,473,363 and 4,468,210 illustrate examples of the plastic outer pulley body molded on a metal disc in a one-step process. U.S. Pat. Nos. 4,913,688 and 5,476,423 illustrate examples of a two-step assembly process wherein first the plastic outer pulley body is molded and then the metal insert is placed into the already molded pulley body.

A number of plastic pulleys with metal inserts are manufactured by the one-step molding process. In the case of a pulley assembly manufactured by a compression molding process, a plastic ring shaped perform is heated until pliable, then cavity molded about the metal insert. A simple way to locate the metal insert within the mold cavity is a single locating pin positioned within the center hole of the metal disc. If the metal insert is a bearing assembly, preserving the concentricity or roundness of the metal bearing is of great importance. Because of the high pressure involved in the compression molding process, the use of a single locating pin through the center of the bearing has been found to result in loss of concentricity of the bearing within the plastic body of the pulley, rendering the bearing unacceptable. Issues that exist with a bearing that is out of round include shortened bearing life at high RPM and possible noise generation.

Traditionally, when producing a pulley by the one-step process of compression molding the plastic body about the metal insert, the outer periphery of the metal insert is physically altered (or upset). Examples include utilizing a metal insert with projections on its outer periphery, such as radially extending scallops, as described in U.S. Pat. No. 4,473,363, or with a knurl applied thereto, as described in U.S. Pat. No. 4,468,210. The outer periphery of the metal insert is altered (or upset) for the purpose of resisting relative rotation between the metal insert and the plastic outer body.

Many pulleys are also produced by the two-step manufacturing process. U.S. Pat. No. 4,913,688 illustrates an example of attaching the metal insert to the plastic outer pulley body after the body has been molded; to assist the bonding of the plastic to the metal, an adhesive, such as epoxy, is applied between the metal and plastic, after the plastic outer pulley body has been molded as a separate piece. U.S. Pat. No. 5,476,423 illustrates first molding a plastic outer pulley body, and while the plastic is still above 38° C. (100° F.), positioning a bearing within the plastic body and cooling the assembly, to allow the plastic body to shrink around and fix the bearing in place. The adhesive bonding method as well as the shrinkage method of attaching the metal insert to the plastic pulley body does overcome the risk of a loss of concentricity of the round metal insert (or bearing), but introduces other problems. The process of bonding with an adhesive presents clean-up and environmental problems. And the method of utilizing the plastic shrinkage to hold the metal insert in place does not, in practice, sufficiently lock the metal insert to the plastic body.

The need remains, particularly in the area of the endless drive belt of a vehicle accessories drive system, for a plastic pulley with a metal insert that may be manufactured easily and successfully by a process which maintains the roundness of the metal insert.

SUMMARY OF THE INVENTION

Accordingly, the present invention has an object the provision of a method of manufacturing a plastic pulley with a metal insert which maintains the roundness of the metal insert.

To achieve the foregoing and other objects and in accordance with a purpose of the present invention, as embodied and broadly described herein, a plastic pulley with a metal insert and method for manufacture thereof is provided.

The invention is drawn to a method for producing a pulley assembly by placing a metal insert, having an outer flat circumferential surface, with or without a locking means affixed thereto, on a locating means, located inside a mold cavity and positioned around the outside circumference of the metal insert. The locating means serves the purpose of positioning the metal insert inside the mold cavity, maintaining the roundness of the metal insert and ensuring the concentricity of the belt engaging portion of the plastic outer pulley body relative to the round metal insert. After the metal insert is placed on the locating means, a plastic annular body is molded about the metal insert.

BRIEF DESCRIPTION OF THE DRAWINGS

The accompanying drawings, which are incorporated in and form a part of the specification and in which like numerals designate like parts, illustrate preferred embodiments of the present invention and together with the description, serve to explain the principles of the invention. In the drawings.

DESCRIPTION OF THE PREFERRED EMBODIMENTS

Figure 1:
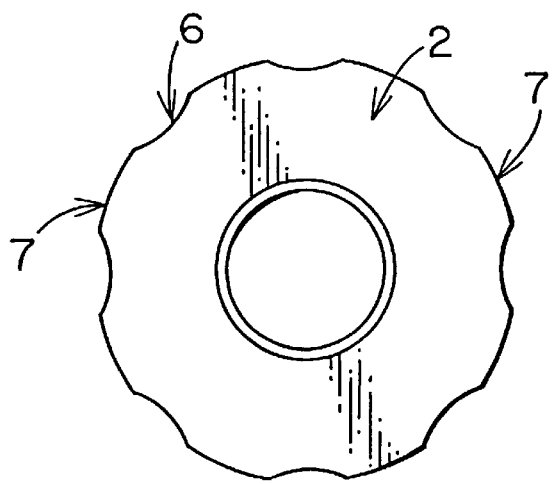
FIG. 1 is an end view of a prior art scalloped metal insert.
Figure 2:
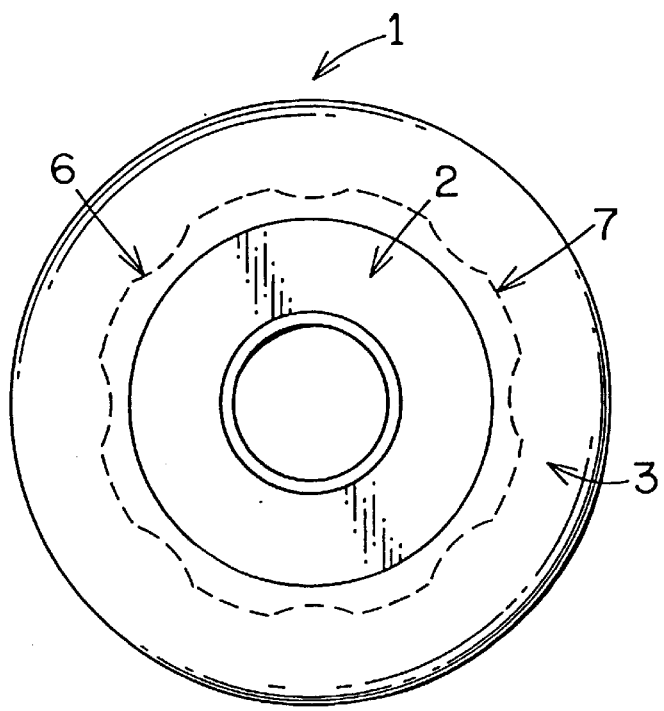
FIG. 2 is an end view of a prior art pulley construction.

Referring to the drawings and particularly to FIGS. 1 and 2, there are shown a prior art scalloped metal insert and a prior art plastic pulley with a metal insert, respectively. Referring to FIG. 1, there is shown a prior art scalloped metal insert 2. The outer peripheral edge 6 is formed with a plurality of radially extending projections, such as scallops 7. The scalloped metal insert 2 is stamped from sheet steel. The prior art plastic pulley and metal insert 1 shown in FIG. 2 consists of two pieces, the scalloped metal insert 2 shown in FIG. 1 and the plastic body 3. The plastic body 3 is supported on and compression molded about the outer peripheral edge 6 of metal insert 2 in a one-step molding process. Scallop projections 7 extend radially into the plastic body 3 and resist relative rotation of metal insert 2 with respect to plastic body 3. As previously described, the prior art plastic pulley and metal insert of FIG. 2, employing the prior art scalloped metal insert of FIG. 1, illustrates an example of a prior art pulley assembly produced via a one-step molding process, the disadvantages of which are overcome by the present invention.

Figure 3:
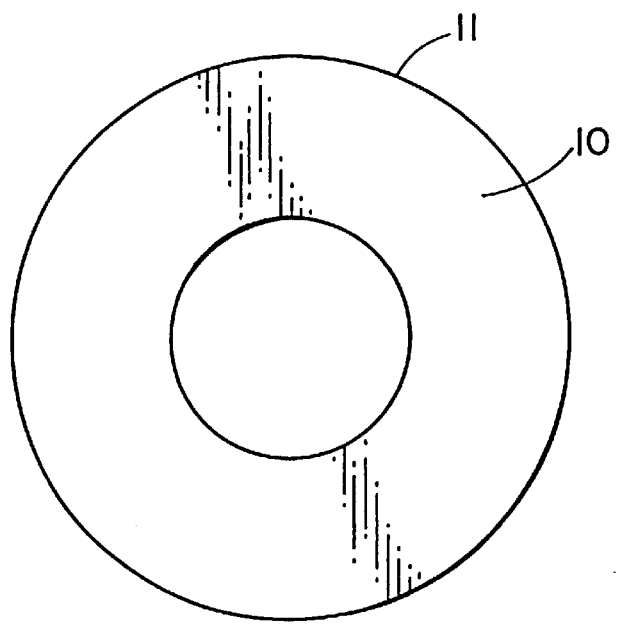
FIG. 3 is an end view of a preferred embodiment of the present invention of the circular metal insert.

Referring to FIG. 3, there is shown in accordance with the present invention an unmodified metal insert 10, prior to being compression molded inside a plastic outer body. The metal insert 10 has a generally flat circumferential outer surface 11. The metal insert 10 is manufactured out of steel, and may be in the form of a disc, a hub or a bearing assembly. A detailed description of a preferred bearing assembly is found in reference to FIG. 7, infra. An unmodified metal insert, as shown in FIG. 3, may be used to produce a pulley by the inventive method disclosed herein.

Figure 4:
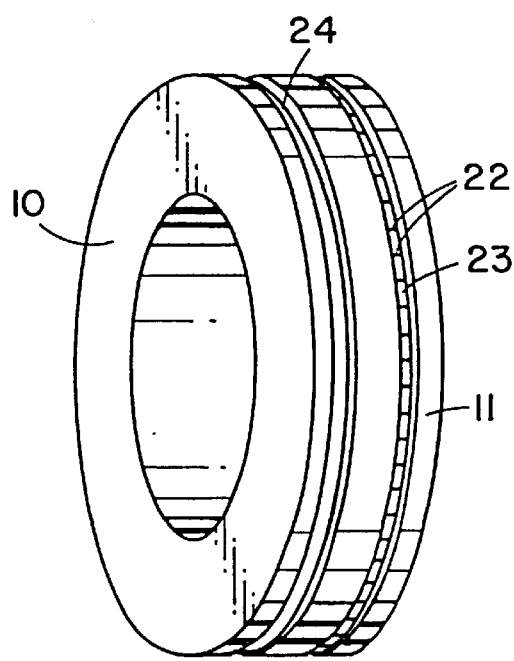
FIG. 4 is a perspective view of a preferred embodiment of the circular metal insert with a knurl applied to the outer circumference of the metal insert prior to the molding of the plastic body about the metal insert.

The metal insert 10 may be modified, if desired, with a locking means, applied to the outer circumferential surface of the metal insert, for clamping and structurally bonding the plastic body about the metal insert, and for resisting relative rotation between the plastic body and the metal insert. In a preferred embodiment, as shown in FIG. 4, a knurl 22, applied to the flat circumferential outer surface 11 of the metal insert 10, operates as the locking means. FIG. 4 shows a metal insert with two grooves 23 and 24 machined into the outer surface 11. Knurl 22 is located within groove 23 and operates as the locking means in the embodiment shown in FIG. 4. It is envisioned that a locking means in the form of a knurl is not limited to the embodiment shown in FIG. 4; groove 24 is not necessary in FIG. 4 for knurl 22 to operate effectively as a locking means. In addition, knurl 22 may be located anywhere along the outer circumferential surface of the metal insert.

Figure 5:
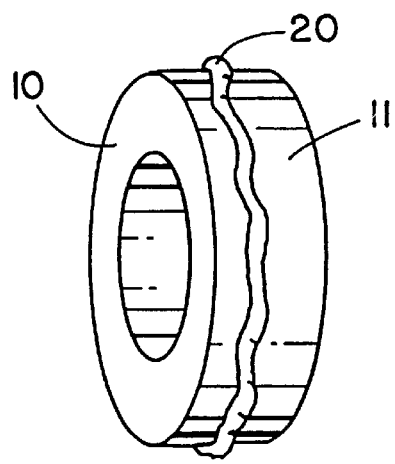
FIG. 5 is a perspective view of another embodiment of the circular metal insert with a cured adhesive bead affixed to the outer circumference of the metal insert prior to the molding of the plastic body about the metal insert.

The metal insert 10 may also be modified, if desired, with a locking means in the form of a cured adhesive bead 20 affixed to the generally flat circumferential outer surface 11, as shown in FIG. 5. As shown in FIG. 5, the cured adhesive bead 20 of metal insert 10 is randomly shaped around the outer circumferential surface of the metal insert. The cured bead extends radially outward from the center. In addition, the cured bead extends axially around the outer circumference of the metal insert. The axial extension of the cured bead assists in resisting relative rotational movement between the metal insert and the outer pulley body.

The particular adhesive from which the cured bead 20 is formed may vary depending upon the physical characteristic desired in the final pulley assembly. One type of adhesive which has been found suitable is a two part epoxy structural adhesive, FUSOR 320/322, sold by Lord Corporation. Other materials having similar characteristics and which meet the criteria set forth above are also envisioned, such as acrylics, urethanes and cyanoacrylates.

In the embodiment shown in FIG. 5, an adhesive bead is added to the outer surface of the metal insert after oil has been removed from the surface with a solvent, and after the surface has been slightly upset by etching. The adhesive bead is then cured. The bead may be cured at room temperature; in the case of FUSOR 320/322, the time to cure at room temperature is approximately twenty-four hours. Heat may be used to accelerate the cure time. Heat may be applied with a heat gun, in an oven or by any other means which meets the requirements of the specific application. In a preferred embodiment, the adhesive bead made of FUSOR 320/322 is cured with a heat gun, at a gun setting of 260° C.; the 260° C. heat gun should be used for at least 100 seconds for an effective cure. Therefore the adhesive bead may be cured either at room temperature or with the addition of heat. Cure times will vary depending on the type of adhesive used and the type of heat applied. The cured bead 20 described above is not limited to a single continuous cured adhesive bead. The cured bead 20 may also be multiple continuous cured adhesive beads or discontinuous cured adhesive bead drops. Also envisioned is adding a continuous metal ring, e.g., a solder ring. Other beads having similar characteristics and which meet the criteria set forth above are also envisioned. This bead technology is described in detail in co-pending U.S. patent application Ser. No. 09/265,096 filed Mar. 9, 1999.

The two locking means described above, the knurl 22 and the cured adhesive bead 20, are not the only types of locking means envisioned for use with the present inventive method. Locking "means" suitable for use with the present invention include upsetting the flat circumferential surface of the metal insert, adding an uncured adhesive to the outer circumferential surface of the metal insert or affixing a protrusion or continuous metal ring or the like, such as by soldering or welding, to the flat circumferential surface of the metal insert. Thus any modification or addition to the outer flat circumferential surface of the metal insert may be employed. In addition, it is envisioned that applying or affixing no locking means to the outer flat circumferential surface of the metal insert may be acceptable for certain applications.

At this point, in a preferred embodiment, the metal insert 10 with the locking means applied thereto, in the form of a knurl 22, is ready for compression molding to attach and to lock thereto a plastic outer pulley body. The particular plastic from which the outer pulley body is formed may vary depending upon the various physical characteristics desired in the final pulley assembly. One type of plastic which has been found suitable for use in molding the outer pulley body is a cellulose filled phenolic plastic sold by Occidental Chemical Corp., under the trademark DUREZ, Grade No. 31735. This phenolic material is specifically formulated to achieve wear resistance, dimensional stability, creep resistance and low weight required for use in a pulley application. Other materials having similar characteristics and which meet the criteria set forth above are also envisioned. A material should be selected which meets the requirements of the specific application.

Figure 5A:
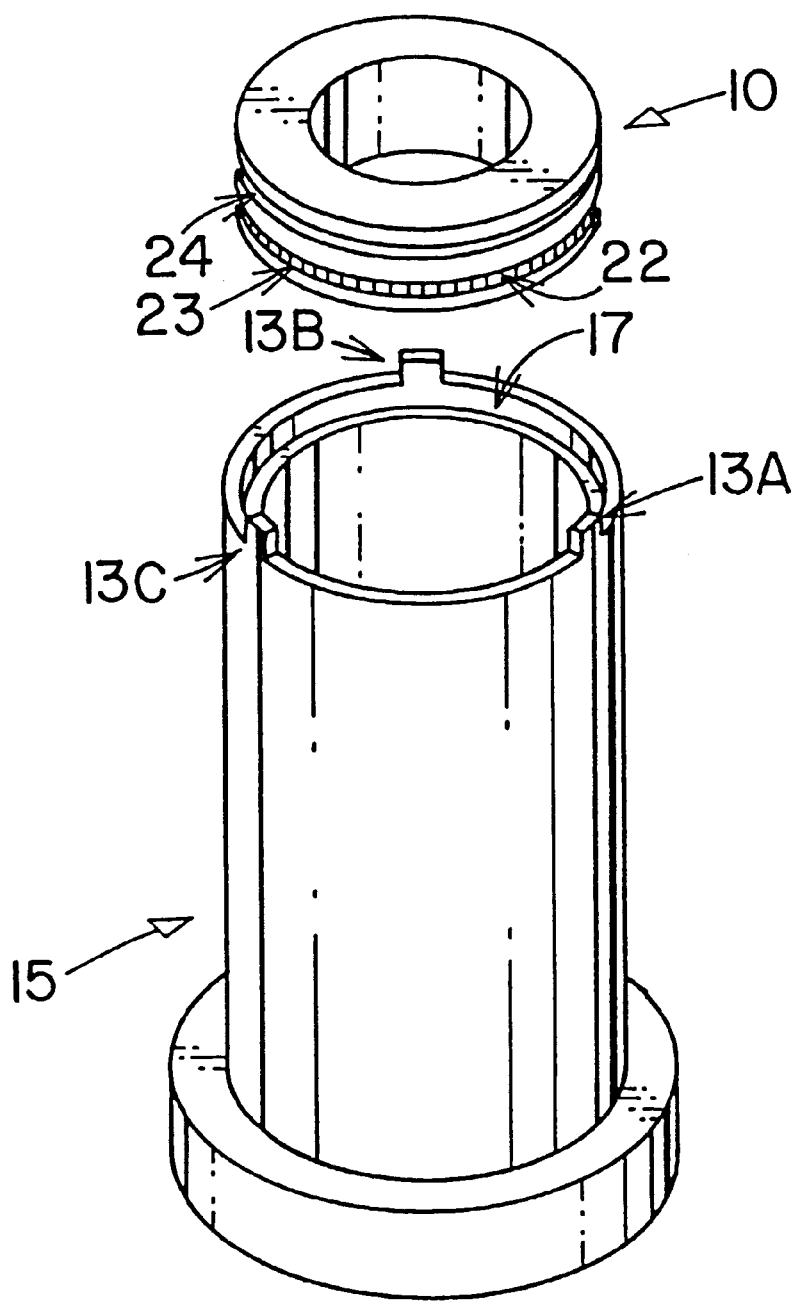
FIG. 5A is a representation of a preferred embodiment of the locating means of the present invention.
Figure 5B:
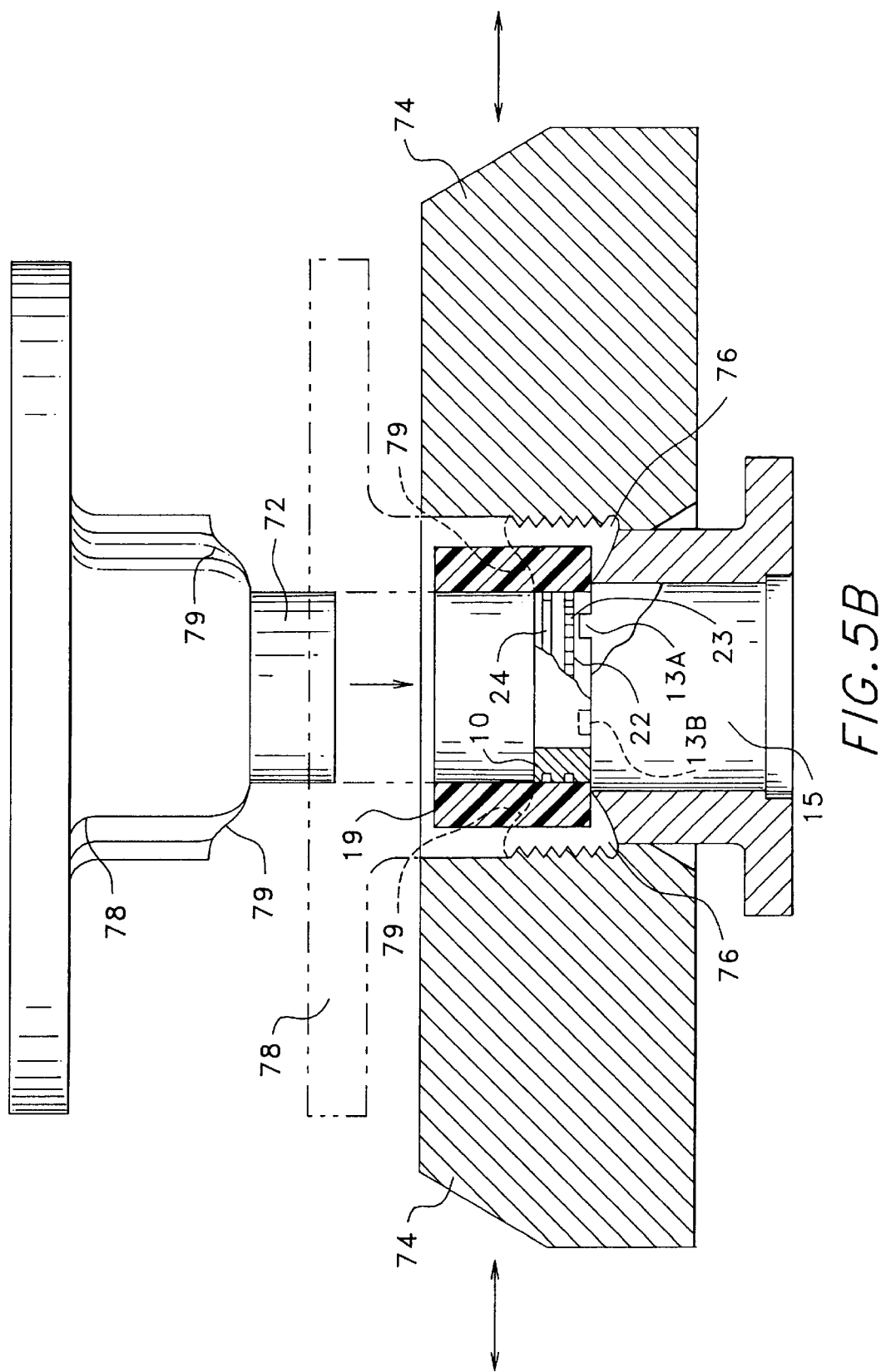
FIG. 5B is a view of a preferred embodiment of a plastic perform and a metal insert inside the mold cavity prior to molding the plastic body about the metal insert.

The metal insert 10 with the knurl 22 applied thereto is then placed in a suitable mold cavity. A preferred embodiment of a mold cavity and molding apparatus for use with the present invention is shown in FIGS. 5A and 5B. FIG. 5A is a partial view of the mold cavity; it shows how the metal insert 10 is held inside the mold cavity before compression molding an outer pulley body about the metal insert. In FIG. 5A, the metal insert 10 with the knurl 22 applied thereto is held inside the mold cavity by locating means located about the outer circumference of the metal insert. The locating means operates to position the metal insert inside the mold cavity before molding and to ensure the preservation of the roundness of the metal insert during the molding process. The locating means may be any form, such as a ring or a plurality of locating pins, located inside the mold cavity and about the outer circumference of the metal insert. In a preferred embodiment, shown in FIG. 5A, the locating means is three locating pins, 13A, 13B and 13C equidistantly spaced about the outer circumference of the metal insert. The locating pins 13A, 13B and 13C are located in cylinder 15, which forms a part of the lower half of the mold cavity. In this particular embodiment, cylinder 15 has a ledge 17, upon which the outer side edge adjacent the outer circumference of metal insert 10 rests. Although ledge 17 is shown in FIG. 5A, it is not necessary in practicing the present invention.

A preferred embodiment of the complete compression molding setup prior to and during molding is shown in FIG. 5B. A plastic ring shaped preform 19, preferably DUREZ Grade No. 31735, is compression molded about the metal insert 10 with a knurl 22 applied thereto. FIG. 5B shows a partial sectional cutaway of the metal insert 10 as well. FIG. 5B shows locating pins 13A and 13B formed in cylinder 15 and located about metal insert 10. Note that locating pin 13B is shown In phantom. FIG. 5B also shows capping pin 72 which makes contact with the outer circumference of metal insert 10 when molding begins and helps stop leakage of the plastic into the metal insert. Capping pin 72 is part of upper cavity 78, which is shown in the open position in solid lines in FIG. 5B, as seen prior to molding. Upper cavity 78 is also shown in FIG. 5B in the closed position in phantom, as seen during molding.

In a preferred embodiment, multiple V-grooves may be formed on the outer circumference of the plastic pulley body; these grooves are created by forming grooves 76 located in slides 74 in FIG. 5B. The slides 74 are shown in FIG. 5B in their proper position during the compression molding operation. The slides 74 swing out away from the molded pulley after molding has taken place. Note that curved sections 79 of upper cavity 78, in the closed position, are shown in phantom and help push down the material into forming grooves 76.

The temperature of the plastic ring shaped perform before compression molding is preferably within the range of about 71° C. through 110° C., or more preferably within the range of 88° C. through 104° C., or most preferably within the range of 93° C. through 99° C., so as to render the perform pliable. The plastic ring shaped perform is compression molded about the knurled metal insert at a still higher temperature preferably within the range of about 149° C. through 191° C., or more preferably within the range of 166° C. through 182° C., or most preferably within the range of 171° C. through 177° C. In the case of compression molding DUREZ Grade No. 31735, the mold should be closed a minimum of 50 seconds for adequate molding time. The combined temperature and pressure due to mold closing (and slides 74 closing) form the molded plastic pulley and metal insert. After molding is complete, the mold is opened. The molded part may then be ejected by ejection pins (not shown).

Figure 6:
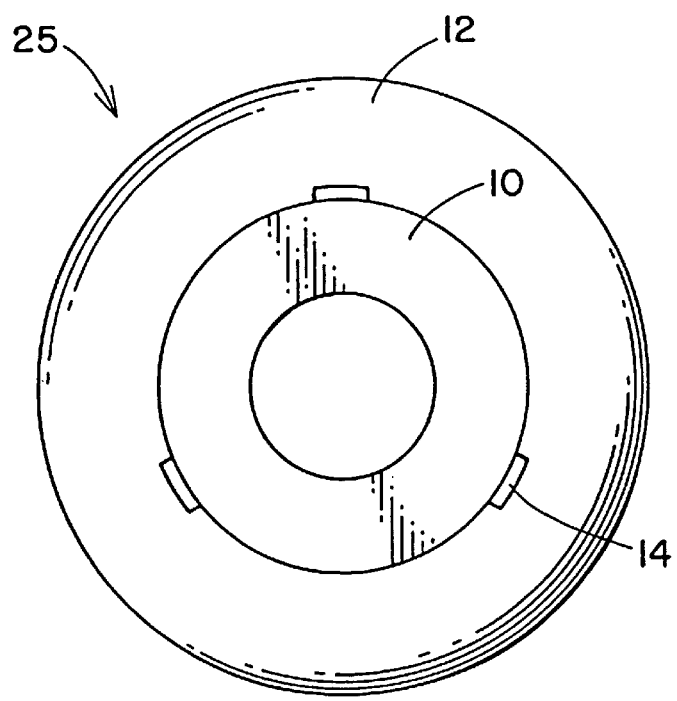
FIG. 6 is an end view of a preferred embodiment of the pulley assembly subsequent to molding of the plastic body about the metal insert of FIG. 4.

A preferred embodiment of the resultant pulley assembly 25 is shown in FIG. 6, formed with the metal insert of FIG. 4. Shown in FIG. 6 are three equidistant rectangular shaped slots 14, formed in the outer plastic pulley body at the interface with the metal insert 10, which are a result of molding around the three locating pins located in the mold cavity. Compression molding of the plastic outer pulley body 12 about the metal insert 10 with knurl 22 applied thereto results in a strong structural bond between the plastic and metal, which helps resist relative rotation between the metal insert and the plastic outer body under normal conditions of operation. Although the preferred embodiment uses a compression molding process for molding the plastic outer pulley body 12 about the metal insert 10, the molding process is not limited to compression molding. Any molding process is envisioned, including compression, injection or transfer molding.

Figure 7:
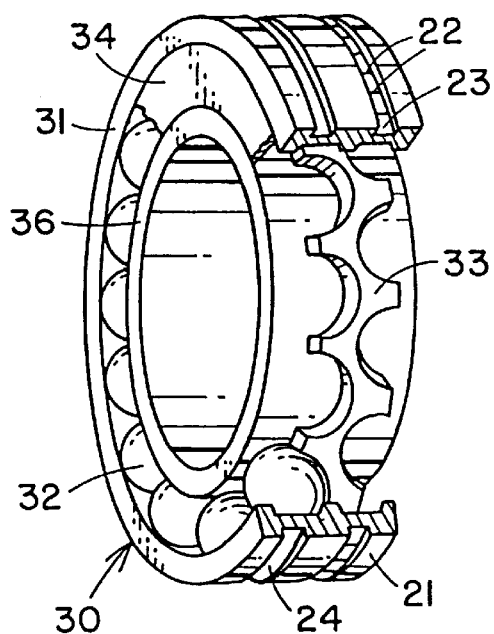
FIG. 7 is a perspective view of another preferred embodiment of a metal bearing insert with a knurl applied to the outer circumference of the metal bearing prior to molding of the plastic body about the metal bearing.
Figure 8:
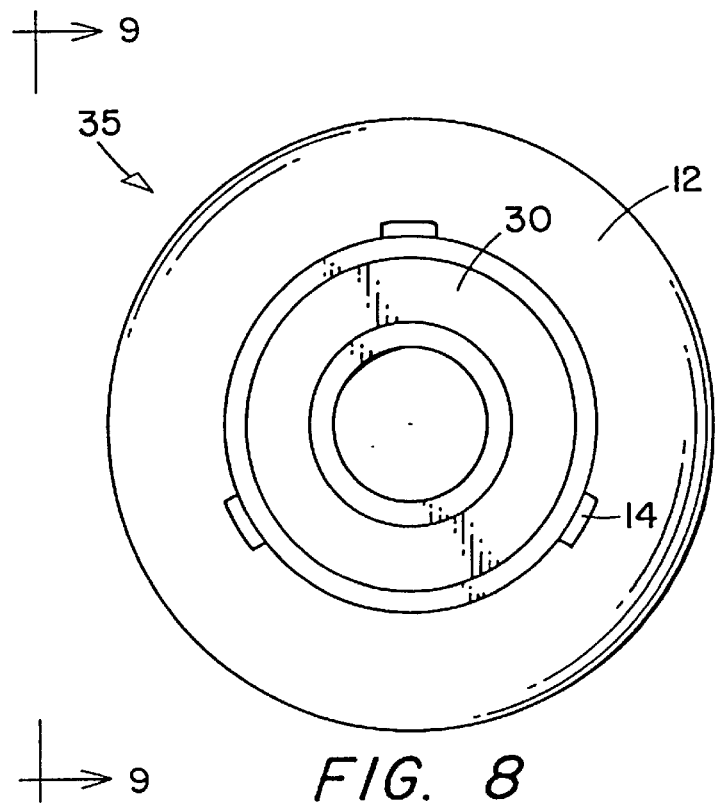
FIG. 8 is an end view of another preferred embodiment of the pulley assembly subsequent to molding of the plastic body about the metal bearing of FIG. 7.

Another preferred embodiment is depicted in FIGS. 7 and 8. Referring to FIG. 7, the metal insert of the invention is shown to be a bearing assembly 30. The particular bearing that is used for bearing assembly 30 may vary depending upon the mechanical properties desired in the final pulley product. One type of bearing which has been found suitable for use as bearing assembly 30 is a steel 6203 type ball bearing by NSK. This bearing is made up of one steel outer ring 31, balls 32, a ball cage 33, a rubber seal 34 used to shield the balls and ball cage, and a steel inner ring 36. This preferred embodiment is not limited to a ball bearing, thus other bearing assemblies having similar characteristics are also envisioned.

A locking means, or in this embodiment a knurl 22, is added to the outer flat circumferential surface of the bearing assembly 21 in a similar fashion described above for FIG. 4, and is shown in FIG. 7. In this embodiment, the bearing assembly 30 with a knurl 22 applied thereto is placed in a mold cavity. The bearing assembly 30 is held inside the mold cavity by at least three locating pins equidistantly spaced about the outer circumference of the bearing, described above as the locating means. Also, as mentioned above, the locating means is not limited to locating pins about the circumference of the bearing; it is also envisioned that the bearing assembly be placed inside a ring located inside the mold cavity. A plastic ring shaped perform is compression molded about the knurled metal bearing assembly, as described above. The resultant plastic pulley 35 is shown in FIG. 8. Shown in FIG. 8 are three equidistant rectangular shaped slots 14, formed in the outer plastic pulley body at the interface with the metal bearing, which are a result of molding around the three locating pins located in the mold cavity, as seen in FIG. 6. The molding process used for producing the pulley in FIG. 8 is not limited to compression molding; it is envisioned that any type of molding may be used, including compression, injection or transfer.

Figure 9:
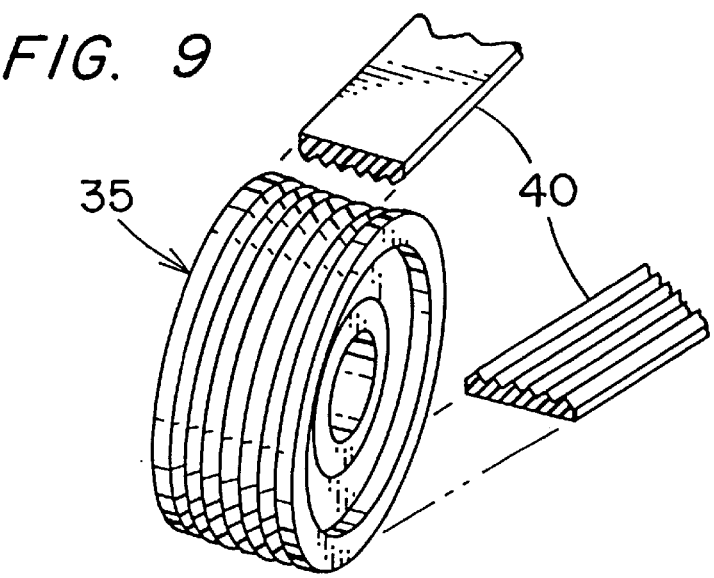
FIG. 9 is a perspective view of another preferred embodiment of the pulley assembly subsequent to molding of the plastic body about the metal bearing taken along the line 9—9 of FIG. 8.

A perspective view of the plastic pulley assembly 35 of FIG. 8 is shown in FIG. 9, with a vehicle accessories multiple V-ribbed drive belt 40 shown in phantom engaged with and trained about the pulley in driving relationship.

Figure 10:
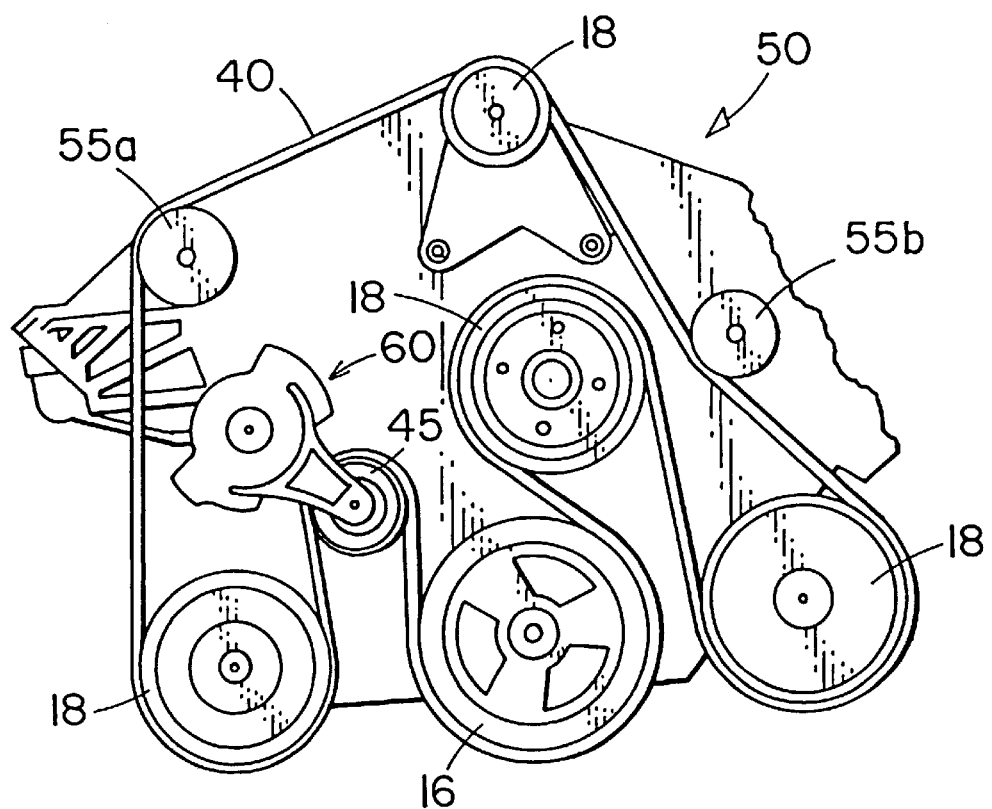
FIG. 10 is a schematic representation of a front end accessory drive system of an engine utilizing at least one idler pulley and a tensioner pulley according to the present invention.

Referring to FIG. 10, there is shown an engine 50 with a flexible serpentine drive belt 40 trained about a variety of driven pulleys 18 operatively associated with accessories. The accessories may comprise, for example, a power steering pump, alternator, air conditioning pump, water pump, or any other device known to those skilled in the art and suggested by this disclosure. Each of the accessories is driven by drive belt 40 from engine crankshaft pulley 16. Tensioner 60 having tensioner pulley 45 applies tension to drive belt 40 to prevent the belt from slipping. A plurality of idler pulleys, 55a and 55b, help to handle the placement of drive belt 40 to allow the belt to service various driven pulleys 18. The present invention is envisioned for use as tensioner pulley 45, groove side idler pulley 55a and backside idler pulley 55b.

The pulley may be molded with or without multiple V-grooves on the outer annular portion of the plastic body. A pulley molded with multiple V-grooves on the outer annular portion of the plastic body is used to receive a multi-V-ribbed belt, e.g. belt 40, in, for example, the endless drive belt application of a vehicle accessories drive system. An example of a pulley molded with multiple V-grooves is groove side idler pulley 55a. Examples of pulleys molded without multiple V-grooves are tensioner pulley 45 and backside idler pulley 55b. Pulleys envisioned for use with this invention are not limited to those used with multi-V-ribbed belts. Pulleys utilizing the locating means of this invention may also accommodate V-belts or synchronous belts, and may include single V-groove pulleys and timing belt sprockets.

The foregoing description and illustrative embodiments of the present invention have been shown in the drawings and described in detail in varying modifications and alternate embodiments. It should be understood, however, that the foregoing description of the invention is exemplary only, and that the scope of the invention is to be limited only to the claims as interpreted in view of prior art. Moreover, the invention illustratively disclosed herein suitably may be practiced in the absence of any element which is not specifically disclosed herein. The invention illustratively disclosed herein is not limited to idler and tensioner pulleys or to automotive applications in general.

What is claimed is:

1. A method for producing a plastic pulley assembly having a circular metal insert in the form of a bearing assemble comprising the steps of:
   a) providing a mold having a mold cavity and locating means adapted to receive and position the bearing assembly insert preparatory to molding, the locating means being positioned radially outwardly and about the circumference of the bearing assembly insert within the mold cavity;
   b) placing the circular bearing assembly insert, having a radially outer circumferential surface, into the mold cavity so that the locating means is positioned upon the outer side edge adjacent the outer circumferential surface of the bearing assembly insert in holding relation, and locating and supporting the insert for molding at at least three points spaced about such outer circumferential surface of the bearing assembly insert;
   c) closing the mold; and
   d) molding a plastic annular pulley body about said bearing assembly insert and removing the plastic pulley assembly from the mold, whereby the roundness of the metal insert is maintained in the finished pulley assembly.

2. The method of claim 1, wherein said locating means is at least three locator pins located inside and spaced about the mold cavity, each pin making substantial contact with said outer circumferential surface of the metal insert.

3. The method of claim 2, wherein said locator pins are equidistantly spaced.

4. The method of claim 1, wherein said locating means is a ring located inside the mold cavity.

5. The method of claim 1, wherein said plastic annular body is formed by compression molding.

6. The method of claim 1, wherein said metal insert has a locking means, applied to said outer flat circumferential surface prior to molding said plastic annular body about said metal insert, for clamping and structurally bonding said plastic body about said metal insert.

7. The method of claim 6, wherein said locking means is a knurl applied to said outer circumferential surface of said metal insert.

8. The method of claim 6, wherein said locking means is a cured bead, bonded to said outer circumferential surface of said metal insert, said bead extending both axially and radially outward.

9. The method of claim 8, wherein said cured bead is a material selected from the group consisting of epoxy, acrylic, urethane and cyanoacrylate.

10. A method for producing a plastic belt pulley assembly having a circular metal bearing assembly insert and a plastic outer pulley body formed with grooves to receive a power transmission drive belt, comprising the steps of:
   (a) providing a mold having a mold cavity with forming grooves complementary in shape to the grooves of the plastic outer pulley body, and locating means adapted to receive and position the metal insert preparatory to molding, the locating means being positioned radially outwardly and about the circumference of the bearing assembly insert within the mold cavity;
   b) placing the circular bearing assembly metal insert, having a radially outer circumferential surface, into the mold cavity so that the locating means is positioned upon the outer side edge adjacent the outer circumferential surface of the bearing assembly metal insert in holding relation, locating and supporting the insert for molding at at least three points spaced about such outer circumferential surface of the bearing assembly insert;

c) closing the mold; and d) molding a plastic annular pulley body about said metal insert and removing the plastic pulley assembly from the mold, whereby the roundness of the metal insert is maintained in the finished pulley assembly.

11. The method of claim 10, wherein said locating means is at least three spaced locator pins substantially equidistantly spaced.

12. The method of claim 10, wherein said bearing assembly has a locking means, in the form of a knurl, applied to said outer circumferential surface prior to molding said plastic annular body about said bearing assembly, for clamping and structurally bonding said plastic body about said bearing assembly.

13. The method of claim 10, wherein said plastic annular body is formed by compression molding, in which a plastic ring shaped perform which has been rendered pliable is mounted about the outer circumferential surface of the metal insert, and then compression molded about the metal insert, leaving in the plastic body of the completed pulley assembly the negative impression of the locating means.

14. The method of claim 8, wherein said cured bead is one continuous bead.

15. The method of claim 8, wherein said cured bead is multiple continuous beads.

16. The method of claim 8, wherein said cured bead is discontinuous bead drops.

17. The method of claim 6, wherein said locking means is a continuous metal ring affixed to said outer circumferential surface of said metal insert.

18. The method of claim 13, wherein the mold is provided with an upper cavity portion defined by a curved section that serves, during molding, to press the plastic material of the preform fully into the forming grooves of the mold cavity.

* * * * *

UNITED STATES PATENT AND TRADEMARK OFFICE
CERTIFICATE OF CORRECTION

PATENT NO. : 6,200,513 B1
DATED : March 13, 2001
INVENTOR(S) : Kevin J. Emmett

It is certified that error appears in the above-identified patent and that said Letters Patent is hereby corrected as shown below:

Column 1,
Line 64, that portion reading "perform" should read -- preform --

Column 7,
Line 15, that portion reading "perform" should read -- preform --

Column 8,
Line 9, that portion reading "assemble" should read -- assembly --

Column 10,
Line 1, that portion reading "perform" should read -- preform --

Signed and Sealed this

Second Day of August, 2005

JON W. DUDAS
*Director of the United States Patent and Trademark Office*